Oct. 26, 1926.
J. HOPKINSON
1,604,164
SCALE
Filed August 27, 1924
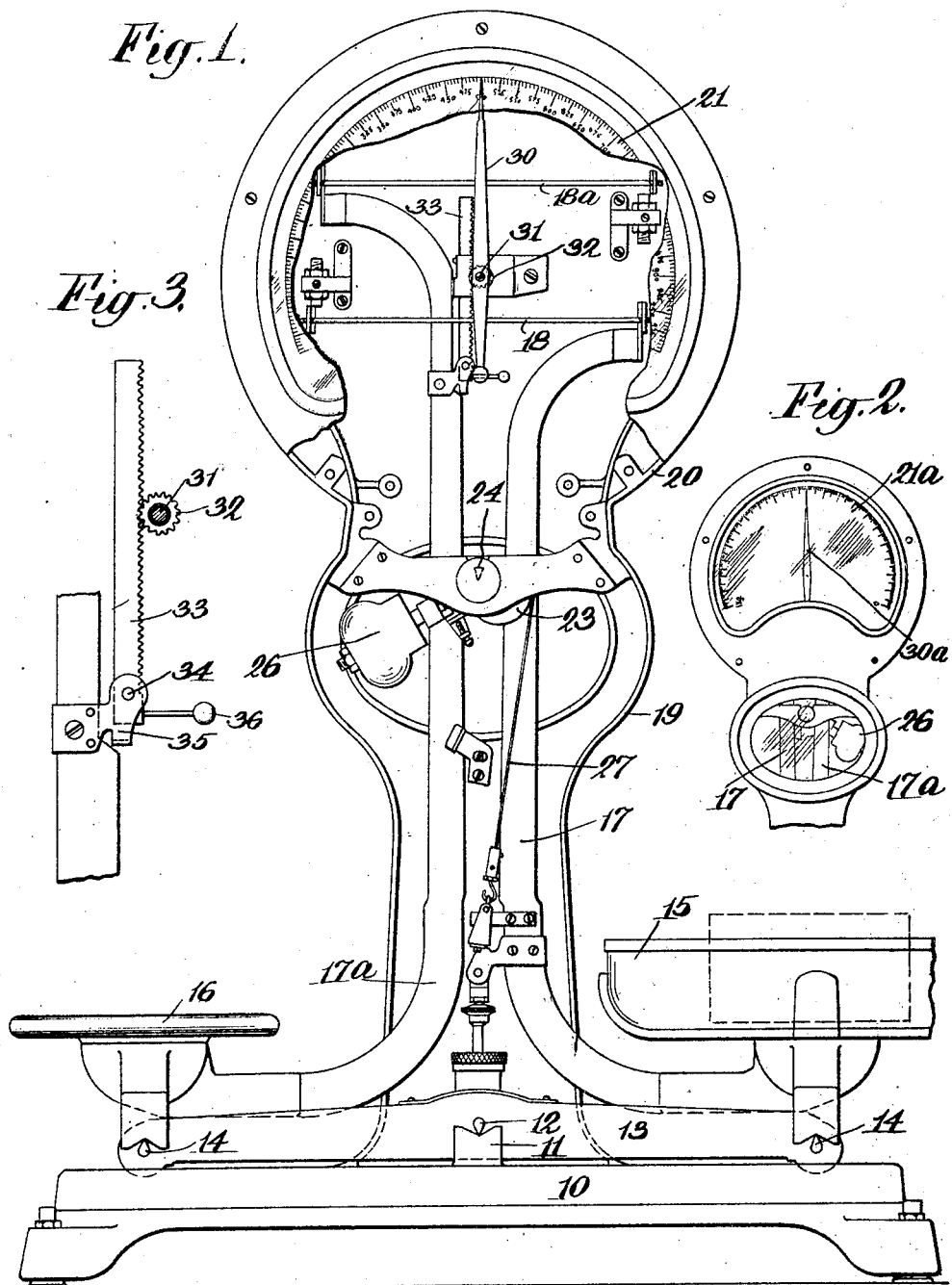
Inventor
Joseph Hopkinson
By his Attorneys
Cooper, Kerr & Dunham Patented Oct. 26, 1926.

1,604,164

UNITED STATES PATENT OFFICE.

JOSEPH HOPKINSON, OF DAYTON, OHIO, ASSIGNOR TO DAYTON SCALE COMPANY, OF DAYTON, OHIO, A CORPORATION OF NEW JERSEY.

SCALE.

Application filed August 27, 1924. Serial No. 734,378.

This invention relates to certain new and useful improvements in the scale shown and described in my Patent No. 817,777.

The objects of the present invention reside in the modifications of the scale shown in the above mentioned patent to the general end that the indicating range may be increased whereby it is possible to utilize charts having graduations spaced further apart. In this way the invention consists in the provision of a construction which will permit the utilization of charts other than the fan type heretofore employed in scales of this class. The invention is particularly directed to improved indicator driving devices so arranged and constructed as to provide a maximum of indicator movement.

In the drawings,

Fig. 1 shows a front elevation of my improved scale.

Fig. 2 is a rear view showing the rear indicator dial, and

Fig. 3 is a detail view of the rack and pinion construction.

In more detail, 10 is the base of the scale having a central bearing 11 which cooperates with knife edges 12 upon the equal arm lever 13. The equal arm lever 13 carries at its ends the usual knife edge pivots 14 which support the goods receiver 15 and weight receiver 16. The goods receiver 15 is supported upon the equal arm lever 13 through an intermediate check 17 which extends upwardly in the housing and at its upper end is pivotally connected with the usual check link 18. The weight pan is similarly supported by a check member 17$^a$ which, at its upper end, connects with the check link 18$^a$. Pedestal 19 is suitably supported on the base and at its upper end has secured to it a chart housing 20. Within the chart housing there are suitably mounted charts 21 and 21$^a$, the former being for the reading of the weight indications from the front of the scale and the latter from the back. In the illustrated embodiment the weight indications alone are shown but it may be understood that this chart may be of the computing type, as desired.

For automatically counterbalancing the applied load a pendulum counterbalance 26 is provided, which counterbalance is preferably connected to the check member 17 through a tape 27 which cooperates with the usual cam 23 adjustably secured to the pendulum 26. Pendulum 26 is suitably mounted upon the usual knife edges 24.

For indicating the applied load I provide indicating pointers 30 and 30$^a$. These pointers are properly balanced and carried upon an arbor 31 which in turn is suitably mounted in ball bearings carried by a bracket which in turn is suitably fixed to the frame of the scale. Fast upon the arbor 31 is a pinion 32. For effecting rotation of the pinion a rack rod 33 is provided pivoted at 34 in a bracket piece 35 which is secured to the check member 17$^a$. For yieldingly pressing the rack 33 into engagement with the pinion 32 an enmeshing weight 36 is provided of the usual form.

The check member 17$^a$ in the present scale serves a dual purpose, namely, that of its check function for maintaining the weight pan horizontal, but, in addition, it serves as a means for actuating the pivotal indicator. The movement of the check member is sufficient to give a more extensive travel of the indicator than was heretofore possible to obtain in scales of this class. The construction herein disclosed enables dials or charts of greater length to be used than heretofore where the indicator device was directly connected to the pendulum cam assembly. With a chart and indicating arrangement herein disclosed it is possible to obtain greater graduation spacing for the same chart capacity and weighing capacity or if it is desired to increase the weighing capacity of the scale over that heretofore obtained it is possible to maintain the chart graduations on the same spacing as heretofore.

What I claim is:—

1. A weighing scale including in combination, a base lever system, check members pivotally supported thereon and adapted to support weight and load receivers, automatic counterbalancing means connected to one of said check members, a pivotal weight indicator, and rack and pinion driving devices therefor, said rack being pivotally connected to one of said check members to be displaced thereby upon an application of a load to the scale.

2. A weighing scale including in combination, a base lever system of the even balance type including an even balance beam system, a plurality of pans pivotally supported above said lever, check members intermediate the lever and said pans, an automatic load counterbalancing device operatively connected to control the extent of displacement of said check members, a pivotal indicator, rack and pinion devices for driving said indicator, said rack being carried by one of said check members and displaced in accordance with the displacement thereof.

3. A weighing scale comprising a lever system of the even balance type, a pair of pans supported thereby, pendulum load counterbalancing means for controlling the displacement of the even balance lever system, a pivotal indicator, a pinion therefor, and a rack for driving said pinion, said rack having driving connections independent of the pendulum and of the actuating parts thereof, for the purpose described.

4. In a weighing scale, in combination, a lever system, a load receiver and a weight receiver supported by said lever system, an automatic load counterbalancing device operatively connected to a rigid extension of one or the other of said receivers, and an indicating device including a pinion, said pinion being rotatable by a rack operatively connected to a rigid extension of one or the other of said receivers.

In testimony whereof I hereto affix my signature.

JOSEPH HOPKINSON.